UNITED STATES PATENT OFFICE.

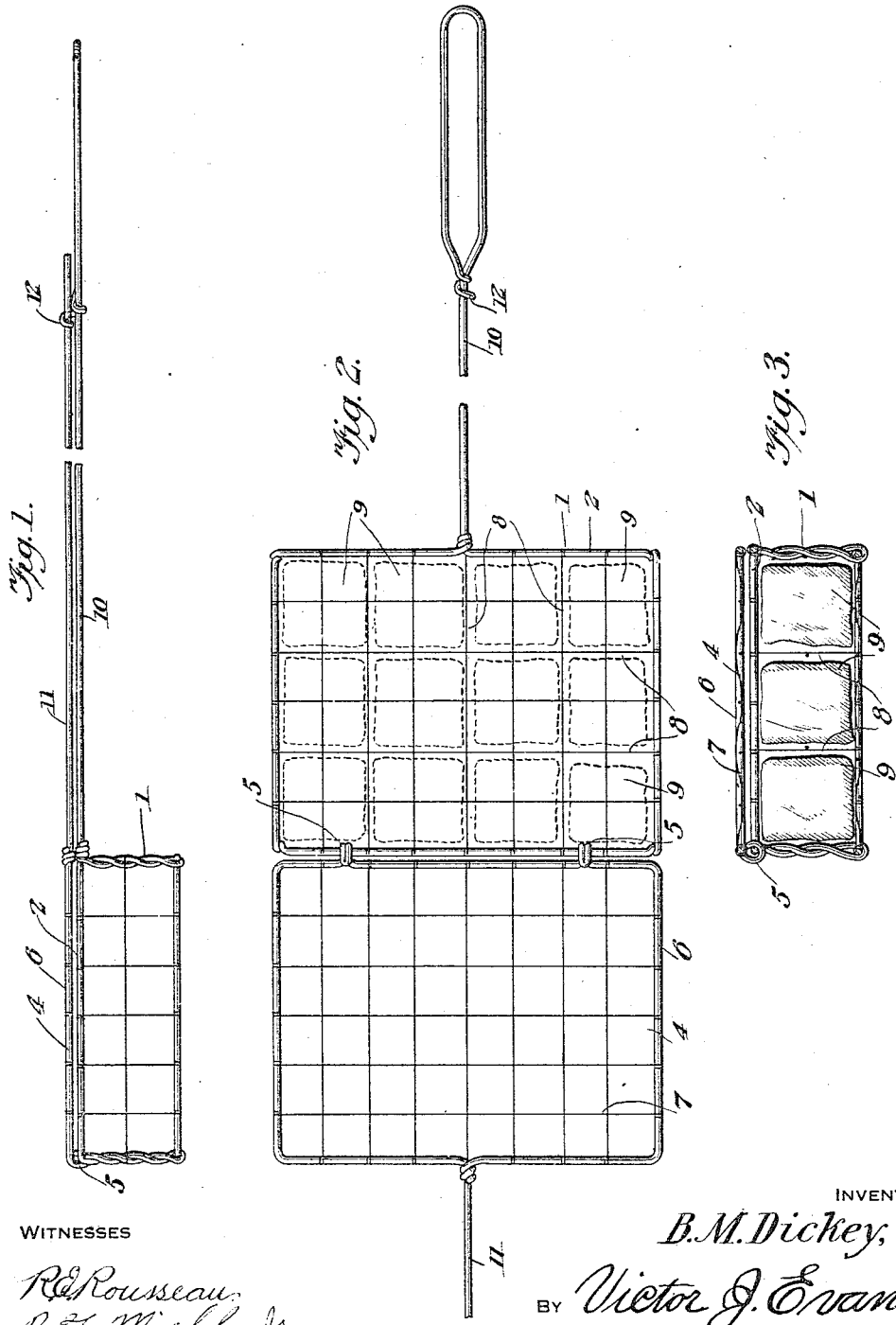

BERNICE MARIE DICKEY, OF INDIANAPOLIS, INDIANA.

MARSHMALLOW-TOASTER.

1,265,627.  Specification of Letters Patent.  Patented May 7, 1918.

Application filed March 2, 1917. Serial No. 152,135.

*To all whom it may concern:*

Be it known that I, BERNICE M. DICKEY, a citizen of the United States, residing at Indianapolis, in the county of Marion and State of Indiana, have invented new and useful Improvements in Marshmallow-Toasters, of which the following is a specification.

My invention relates to improved apparatus for toasting marshmallows. The usual way to toast marshmallows is to fasten them upon a fork or prong, one at a time, and hold them over the fire until sufficiently toasted. In toasting marshmallows the inner portion thereof becomes soft and sticky and adheres to the prong or fork, and it is hard to remove the marshmallow therefrom without mutilating the same.

The object of this invention is to provide means whereby a number of marshmallows may be toasted simultaneously, and to provide means whereby the marshmallows will not be mutilated in removing them from the toaster.

With these and other objects in view which will be hereinafter fully described and pointed out in the claim, the invention consists in the novel construction and arrangement of parts illustrated in the accompanying drawings forming a part of this specification, in which:

Figure 1 is a side elevation of a marshmallow toaster embodying my invention,

Fig. 2 is a top plan view of the same with the cover opened,

Fig. 3 is a vertical section of the device.

Like characters of reference indicate like parts in the various views.

In the drawings 1 indicates the body of the toaster generally. The body is constructed of a wire frame 2, bent to outline an inclosure which in the preferred embodiment is rectangular in form. A wire meshing is stretched across the various planes outlined by the frame and inclosure. A cover 4 is provided having one end hinged to the adjacent frame member, as designated at 5. The cover is constructed of a wire frame 6 upon which is stretched a wire meshing 7. A series of wire mesh partitions 8 are placed within the inclosure of the body and divide the same into a series of individual compartments, as designated at 9 in the drawing, each compartment being adapted to hold a marshmallow. The top of these compartments is closed by the cover 4.

A handle 10 is affixed to the frame 2 on the opposite side of its hinged connection with the cover. Said handle extends outwardly from the frame and is terminated to be conveniently grasped by the hand. The cover 4 is provided with an extension 11 and extends above the handle 10 when the cover is closed. A latch 12 is provided on the handle and is adapted to engage the extension 11 and hold the cover shut.

In toasting marshmallows with the above described device, a marshmallow is placed in each compartment 9 and the cover closed and latched by engaging the extension 11 with the latch 12. The marshmallows are then held over a fire until sufficiently toasted. Upon withdrawing the device from the fire, the cover is opened by disengaging the extension 11 from the latch 12 and swinging it open. The extension 11 of the cover allows the cover to be opened with the bare hands without touching any of the portions thereof which have been heated during the toasting operation.

It will be noted that marshmallows are covered with a sugar or flour or other non-adhesive substance to prevent them from adhering to any article which they contact. This non-adhesive covering serves to prevent the marshmallows from sticking to the wire meshing while they are being toasted and the marshmallows are easily removed from the compartments by opening the cover and turning the device upside down.

Having thus fully described my invention, I claim:

A marshmallow toaster comprising a wire frame defining a rectangular receptacle, a handle extending from one upper edge thereof, a rectangular frame defining a cover hinged upon the opposite upper edge of said receptacle, a handle on said cover frame coöperating with said first named handle, wire mesh covering the sides and bottom of said receptacle, wire mesh covering said cover frame, and longitudinal and transverse partition strips of wire mesh permanently secured upon the ends and sides of said receptacle defining rectangular compartments for the individual reception of marshmallows.

In testimony whereof I affix my signature.

BERNICE MARIE DICKEY.

Copies of this patent may be obtained for five cents each, by addressing the "Commissioner of Patents, Washington, D. C."